United States Patent [19]

Pucher

[11] 4,227,366
[45] Oct. 14, 1980

[54] CORN HEADER DRIVE SYSTEM

[75] Inventor: Richard A. Pucher, Leola, Pa.

[73] Assignee: Sperry Corporation, New Holland, Pa.

[21] Appl. No.: 64,327

[22] Filed: Aug. 6, 1979

[51] Int. Cl.³ ...................... A01D 45/00; A01D 69/00
[52] U.S. Cl. ......................................... 56/14.2; 56/98; 56/106
[58] Field of Search ................. 56/98, 119, 14.1, 14.2, 56/105, 106, 103, 104, 111, 112, 108, 14.3, 94

[56] References Cited

U.S. PATENT DOCUMENTS

| | | | |
|---|---|---|---|
| 3,520,121 | 7/1970 | Ashton et al. | 56/14.1 |
| 3,589,110 | 6/1971 | Schreiner et al. | 56/14.1 |
| 3,609,948 | 10/1971 | Jones et al. | 56/14.2 |
| 3,982,385 | 9/1976 | Hyman | 56/106 |

FOREIGN PATENT DOCUMENTS 1582361 4/1974 Fed. Rep. of Germany .............. 56/98

OTHER PUBLICATIONS

Sperry New Holland, Operators Manual, Corn Head 962, ©1978.

Primary Examiner—Paul J. Hirsch
Attorney, Agent, or Firm—Larry W. Miller; Frank A. Seemar

[57] ABSTRACT

A drive system for a corn harvesting header is disclosed wherein the power input shaft delivering rotational power to the individual row units is positioned externally of the gear housing. A slip clutch for each individual row unit is affixed to the power input shaft rearward of each gear housing and is connected thereto by an endless chain. This improved drive system allows maintenance of the row units without disturbing the power input shaft and maintenance of the slip clutches without disturbing the row units.

15 Claims, 5 Drawing Figures

CORN HEADER DRIVE SYSTEM

BACKGROUND OF THE INVENTION

The present invention relates generally to row crop harvesting machinery and, more particularly, to an improved drive system for a corn harvesting header.

Corn headers include individual row units normally designed for harvesting a single row of crop material. To accommodate various spacings between rows of crops, these row units are usually adjustably attached to a horizontally disposed frame member. The modern trend in corn headers appears to be one of placing the row units at a low profile to the ground and providing for increasingly larger capacity.

The moving components of the corn header, such as the gathering chains, auger, etc., are generally powered by the combine base unit. A transversely disposed power input shaft delivers rotational power to the individual row units. As can be seen in U.S. Pat. No. 3,589,110, for example, this power input shaft is commonly placed within the gearbox and continues therethrough from one gearbox to the next. The slip clutch for each respective gearbox is seen affixed to a member contained within the gearbox and movable therewith.

This arrangement leads to several disadvantages. To service the row units or remove them from the header for any reason, the drive shaft must be withdrawn from the gearbox. Furthermore, to service or replace the slip clutches, after removing the drive shaft, the slip clutch must be disconnected from the gearbox. Also with some drives, the slip clutch is located such that it protrudes from the side of the row unit frame, thereby limiting the minimum spacing possible between the individual row units.

Other drive systems utilize short drive shafts, rearward of each row unit, which must be coupled to one another to operably power the header. Such drive systems inherently have alignment problems requiring additional parts, thereby increasing both the weight and cost of the header. Some drive systems utilize separate shafts to drive the gathering chains and the stalk rolls, creating a spacial problem. The necessary extra width of gearbox area allows more "dead" area between the gathering chains and the consolidating auger thereby enabling crop material to become hung-up and clog the row unit.

SUMMARY OF THE INVENTION

It is an object of this invention to overcome the aforementioned disadvantages of the prior art corn header drive systems.

It is another object of this invention to provide a design which can be manufactured and utilized simply and inexpensively.

It is still another object of this invention to provide a corn header in which the individual row units can be removed for service and maintenance without disturbing the drive shaft.

It is a further object of this invention to provide a corn header drive system wherein the individual slip clutches are positioned exterior of the individual row units and can be removed for service and maintenance without removing the individual row units from the header and without disturbance to the row unit gearbox.

It is a feature of this invention to provide for adjustable row units whereby the spacing between the adjacent row unit can be selectively adjusted to correspond to the spacing of the rows of crop material.

It is a still further object of this invention to provide a corn header for which the minimum spacing between the individual row unit is limited only by the row unit frame.

It is an advantage of this invention to provide a lower cost corn header having less weight to facilitate the expansion to even larger sized corn headers.

It is a still further object of this invention to minimize the distance from the gathering chain to the consolidating auger.

It is an even further object of this invention to provide a corn header drive system which is durable of construction, inexpensive of manufacture, easily maintained, simple to construct and effective in use.

These and other objects, advantages and features are accomplished according to the instant invention by providing a drive system for a corn harvesting header wherein the power input shaft delivering rotational power to the individual row unit is positioned externally of the gear housing. A slip clutch for each individual row unit is affixed to the power input shaft rearward of each gear housing and is connected thereto by an endless chain. This improved drive system allows maintenance of the row units without serving the power input shaft and maintenance of the slip clutches without disturbing the row unit.

BRIEF DESCRIPTION OF THE DRAWINGS

The advantage of this invention will become apparent upon consideration of the following detailed disclosure of the invention, especially when taken in conjunction with the accompanying drawings wherein.

DETAILED DESCRIPTION OF THE DRAWINGS

Figure 1:
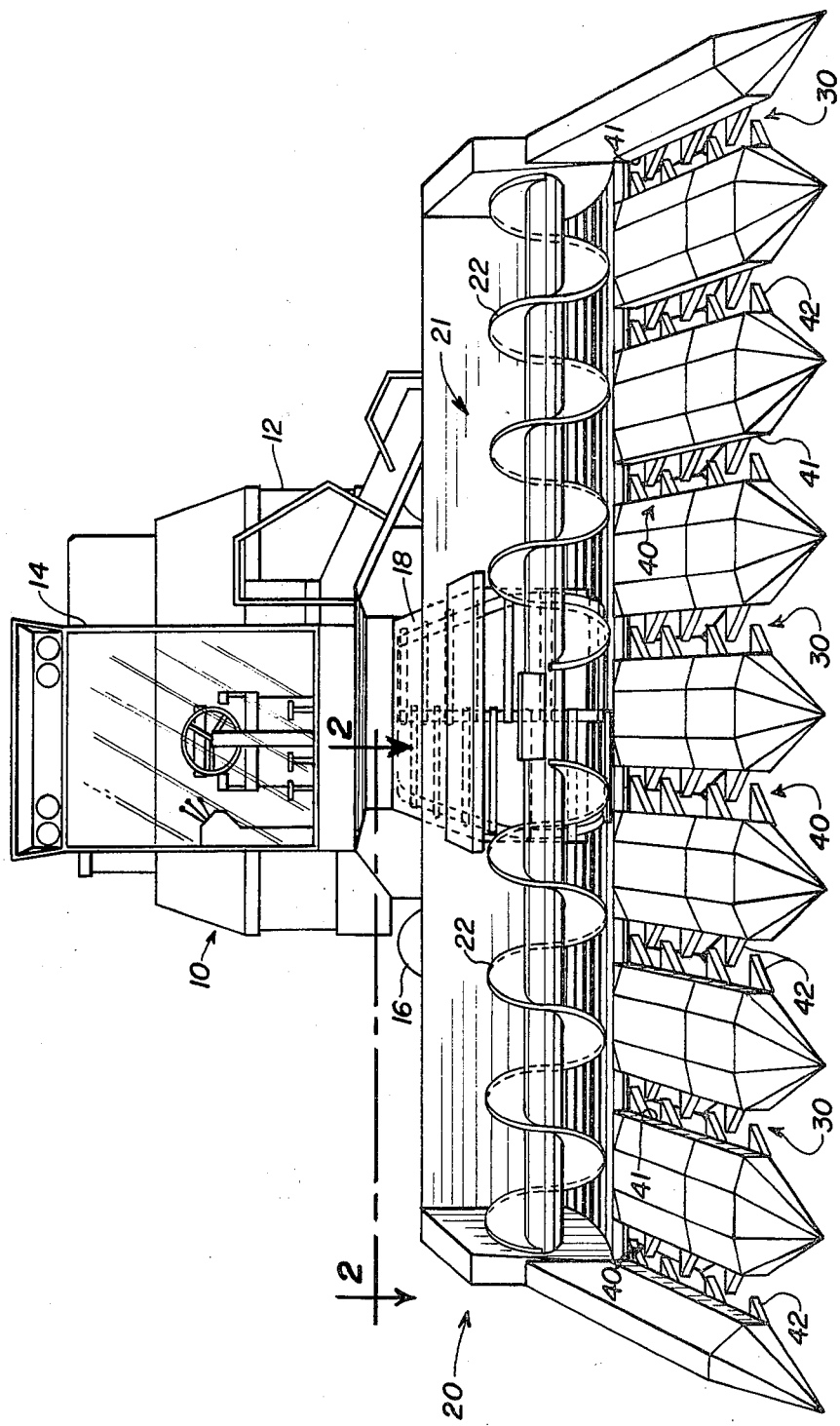
FIG. 1 is a front elevational view of a combine unit having a corn harvesting header attached thereto.

Referring now to the drawings and particularly to FIG. 1, a front elevational view of a combine having a corn harvesting header attached thereto can be seen. Left and right references are used as a matter of convenience and are determined by standing at the rear of the machine facing the forward end, the direction of travel. The corn harvesting header 20 is attached to the front of a combine base unit 10 for harvesting row crop material such as corn. Generally, the combine base unit 10 is comprised of a crop treating unit 12, a cab 14, elevated above the header 20 for full view of the crop harvesting process occurring in the header, a wheeled frame 16 and a feeder house structure 18 for conveying crop harvested by the header 20 rearwardly to the crop treating unit 12.

As can clearly be seen in FIG. 1, the corn harvesting header 20 is generally comprised of individual row units 30, spaced to correspond to the spacing of the row crop material to be harvested, and a consolidating means 21, seen in the form of a auger 22, for transporting the harvesting crop material to the center of the header 20 for engagement with the feeder house 18.

Figure 2:
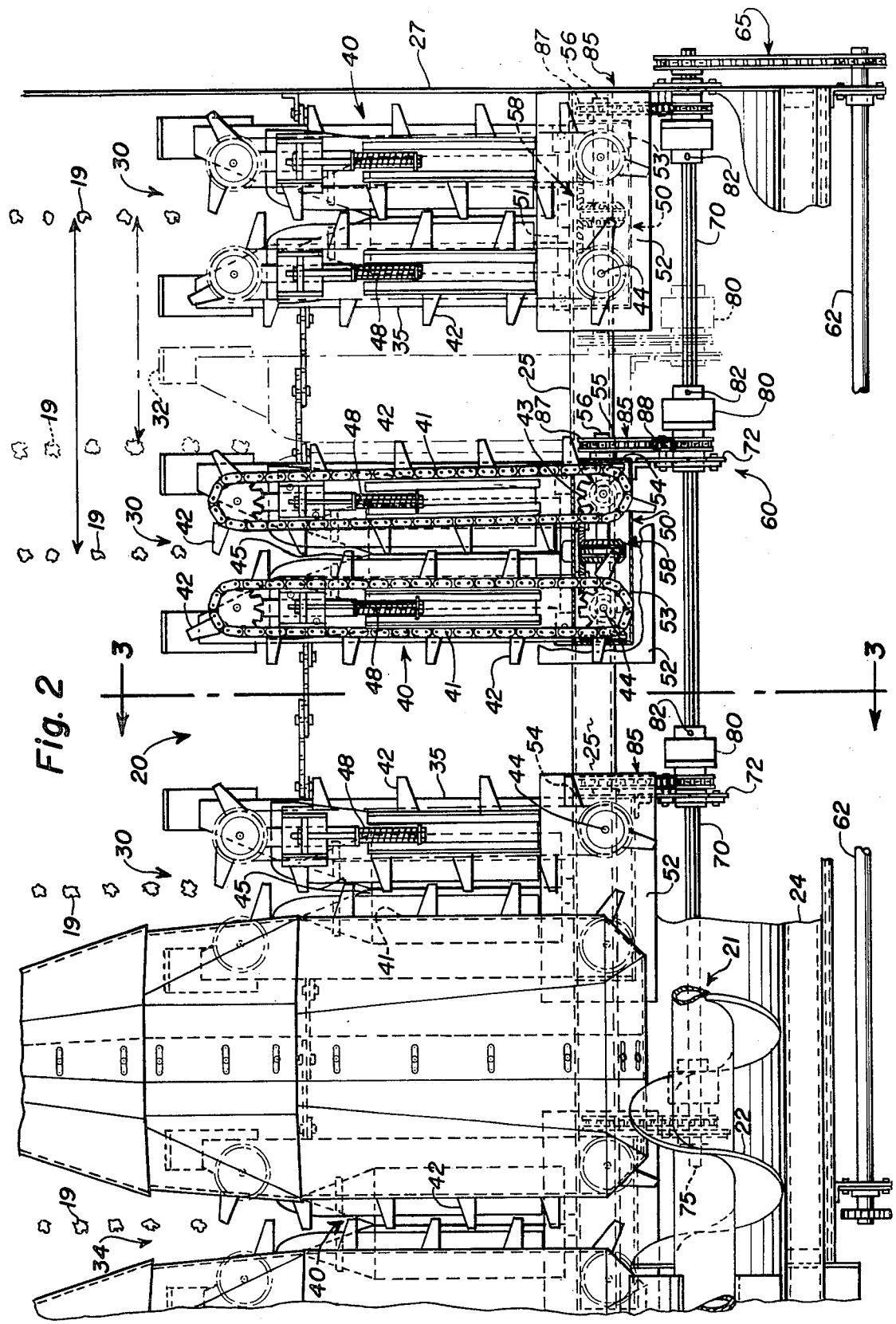
FIG. 2 is a partial top view of the corn harvesting header seen in FIG. 1, with various portions broken away for clarity, corresponding to line 2—2.

Referring now to FIG. 2, a more detailed view of the individual row units 30 and the drive system 60 can be seen. Each individual row unit includes a gathering means 40 for harvesting the crop material 19 and delivering it rearwardly toward the consolidating means 21. The gathering means 40 is shown in FIG. 2 as including a dual set of gathering chains 41 which are counter-rotatable and operable to convey the crop material rearwardly. These gathering chains 41 are equipped with lugs 42 to facilitate this process. The lugs 42 are shown in FIG. 2 as having a staggered relationship, with the lug of one gathering chain being between adjacent lugs of the opposing gathering chain. Since it has been found that timing the lugs in opposing alignment works as well as the displayed arrangement, one skilled in the art should realize that this arrangement is not a limitation to the instant invention.

Figure 3:
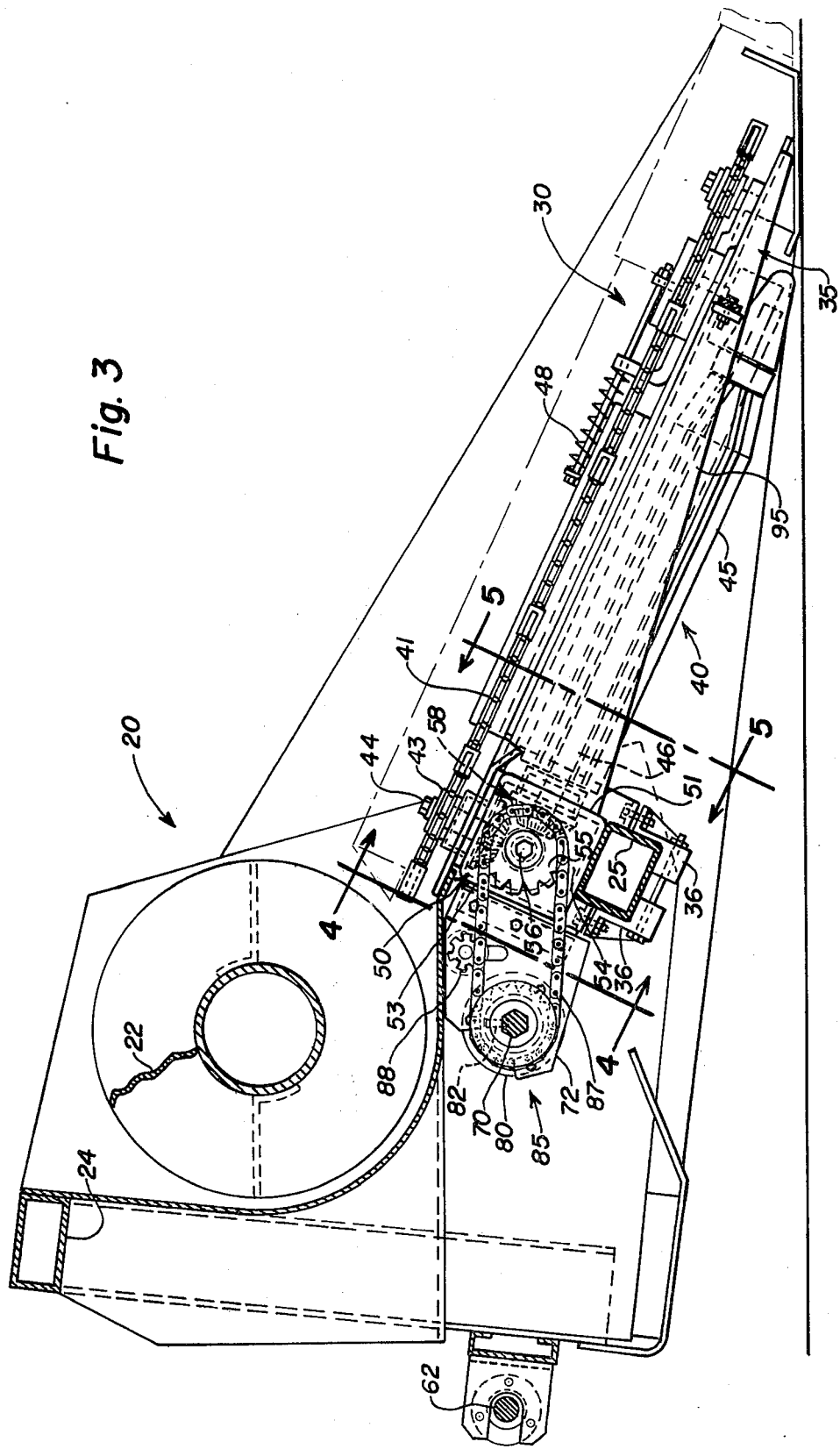
FIG. 3 is an enlarged cross sectional view of the corn header corresponding to line 3—3 of FIG. 2.

As seen in FIGS. 2 and 3, the gathering means 40 also includes a pair of counter-rotating stalk rolls 45 positioned beneath the gathering chains 41. The stalk rolls 45 are operable for pulling the crop material 19 downwardly between the gathering chains 41. Also seen positioned on top of the row unit 30 is a tensioning device 48 for maintaining tension within the gathering chains 41.

A box beam 50 for housing the various gears 58, for driving the gathering means 40, is an integral, unitary part of the frame 35 of each row unit 30. A shaft 56, with a power receiving sprocket 55 affixed thereto, protrudes from the side 54 of the box beam 50. Rotation of the power receiving sprocket 55 and the affixed shaft 56 provides a source of rotation to the various gears 58 which in turn rotate the gathering chains 41 and the stalk rolls 45. The stalk rolls 45 are connected to shaft 46 extending from the front 51 of the box beam 50, while the gathering chains 41 are rotated by a shaft 44 and associated drive sprocket 43 projecting upwardly from the top 52 of the housing 50.

Both the stalk roll shaft 46 and the drive shaft 44 to the gathering chains 41 are driven by gearing 58 attached to the single power receiving shaft 56. The use of one power receiving shaft 56 to drive the entire gathering means 40 enables the distance from the end of the gathering chains 41 to the consolidating auger 22 to be kept at a minimum which reduces the chances of the row unit 30 becoming clogged or plugged.

The header frame 24 includes a horizontally disposed transverse beam 25 seen in both FIGS. 2 and 3. This beam 25 provides support for each individual row unit 30, which are attached to the beam 25 by two pairs of Z-shaped clamps 36. Each pair of clamps 36 is bolted together and to the frame 25 of the row unit 30, effectively encircling the beam 25 and, thereby, providing a positive clamping method and a stable header structure.

The power input shaft 70 is located substantially parallel to the beam 25, rearward of the individual row units 30 and externally of the box beam 50 portion of the row unit frames 35, which serves as a gear housing. The power input shaft 70 is rotatably supported by a mounting bracket 72 affixed to the rear 53 of each row unit frame 35. With smaller headers, one single power input shaft 70 can provide rotational power to all of the row units. However, with headers 20 of the size seen in FIG. 1, it has been found that two power input shafts 70, each providing rotational power to half of the row units 30, is most efficient. As can be seen in FIG. 2, the power input shaft 70 provides power to the group of four row units closest to the right side 27 of the header 20. The end 75 of the power input shaft 70 can be seen rearward of the fourth row unit 34 from the right side 27.

A slip clutch 80 is provided for each row unit 30 and is located on the power input shaft 70 rearward of the power receiving sprocket 55. The slip clutch 80 provides protection for the entire drive system 60. If the gathering means 40 of any one of row units 30 becomes clogged with crop material, and, therefore, requires more power to operate than the drive components were designed to handle, the slip clutch 80 becomes disengaged and prevents further transfer of power to that particular gathering means; however, the power input shaft 70 continues to rotate and provides rotational power to all the row units 30 whose slip clutches 80 remain engaged. Each slip clutch 80 is attached to the power input shaft 70 by a set screw 82 to prevent lateral movement and can be positioned to provide power to either side of the housing 50.

A power transfer means 85, including an endless chain 87, transfers rotational power from each slip clutch 80 to the respective power receiving sprocket 55, which in turn rotates the various gears 58 to operate the gathering means 40. The power transfer chain 87 is connected to the slip clutch 80 in such a manner that when the slip clutch 80 becomes disengaged, power can no longer be transferred to the power receiving sprocket 55 until the slip clutch 80 is re-engaged. As can be best seen in FIG. 3, the power transfer means 85 also includes a tensioning sprocket 88 to maintain proper tension in the chain 87. The term "endless chain" is used throughout this application to indicate the physical appearance of the chain member rather than the true structural configuration.

The combine base unit 10 serves as the prime mover for the header drive system 60. The header drive shaft 62 receives rotational power from the base unit 10 and transfers it to the power input shaft 70 at the right side 27 of the header 20 by a chain and sprocket means 65. With corn headers 20 of the size seen in FIG. 1, having two power input shafts 70, a header drive shaft 62 and chain and sprocket means 65 would be necessary for each half of the header 20. It should further be realized by one skilled in the art that the left half of the header s substantially the mirror image of the right half.

Each row unit 30 is adjustable with respect to spacing between adjacent row units. The row unit 32 shown in phantom depicts how closely the row units 30 may be spaced from each other. Since the clip clutch 80 is placed on the power input shaft 70 rearward of the row unit 30, only the frames 35 of the row units themselves limit the spacing therebetween. To adjust the row unit spacing, it would only be necessary to loosen the Z-shaped clamps 36 mounting the row unit to the horizontal beam 25 and loosen the set screw 82 fastening the slip clutch 80 to the power input shaft 70, then the row unit 30 can be moved along the horizontal beam 25 to the desired location and the slip clutch 80 slide along the power input shaft 70 to a position in proper alignment with the row unit.

Figure 4:
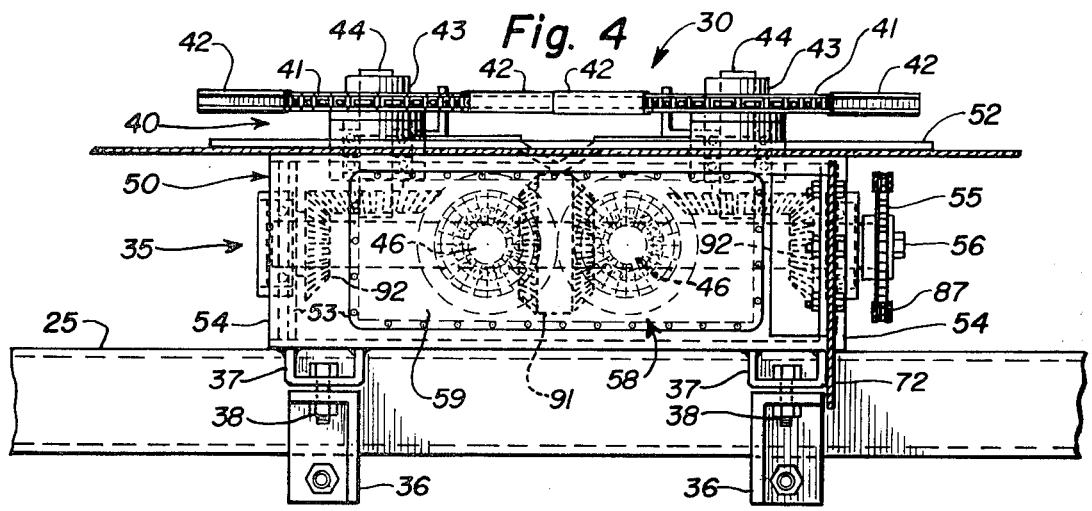
FIG. 4 is an enlarged cross sectional view of the corn header, corresponding to line 4—4 of FIG. 3, showing a rear view of an individual row unit.

In FIG. 4, the rear view of an individual row unit can be seen. The row unit frame 35 is secured to the horizontal beam 25 by Z-shaped clamps 36 secured to tabs 37 by bolts 38. Centrally located bevel gear 91, which drives the stalk roll shafts 46, and laterally located bevel gears 92, which drive the gathering chain drive shaft 44, are connected to the single power receiving shaft 56 to compactly and efficiently drive the crop gathering means 40. The rear 53 of the box beam portion 50 of the row unit frame 35 includes an access plate 59 to faciliate service and maintenance to the various gears 58.

Figure 5:
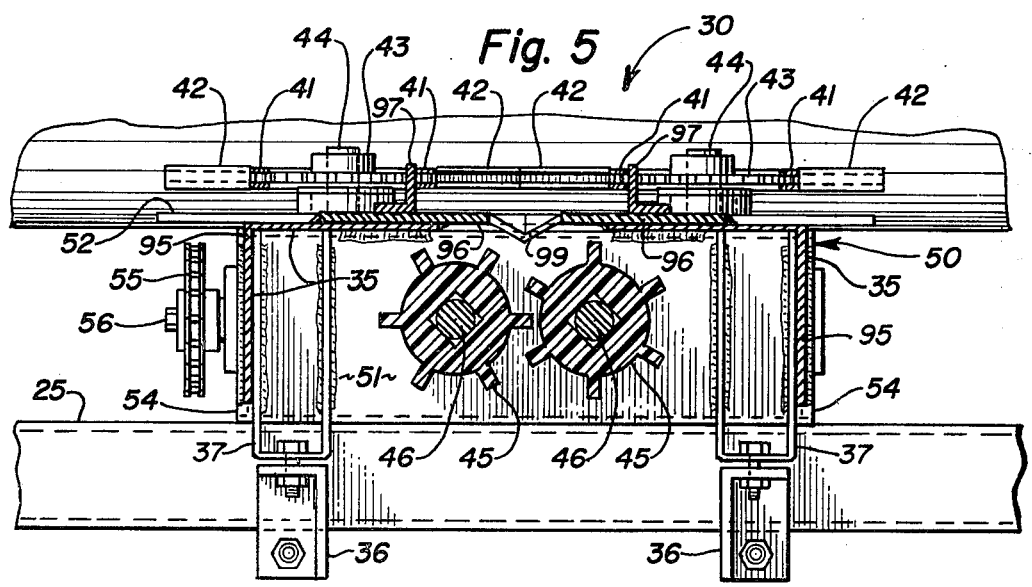
FIG. 5 is an enlarged cross sectional view of the row unit corresponding to line 5—5 of FIG. 3.

Referring now to FIG. 5, a more detailed view of the row unit frame structure can be seen. The box beam 50 is an integral, unitary part of the row unit frame 35, which increases the strength of each individual row unit 30. Tabs 37 are affixed to the front 51 of the box beam 50 to provide a means for securing the row unit 30 to the horizontal beam 25 in cooperation with the Z-shaped clamps 36.

As can be seen in both FIGS. 3 and 5, the row unit frame 35 further includes legs 95 projecting forwardly from the box beam 50. These legs 95, having an L-shaped cross sectional configuration, in turn support spaced apart deck plates 96 which cooperate with the stalk rolls 45 and gathering chains 41 to harvest ears of corn. Chain guides 97 are affixed to the deck plates 96 to maintain the rotating gathering chains 41 in their proper positional relationship, while a V-shaped cutoff 99 is positioned between the deck plates 96 adjacent the box beam 50 provides a means for cutting the crop material.

As can be readily realized, this row unit frame is stronger and more stable than those found in the prior art and, consequently, can be constructed to weigh less. Therefore, expansion to larger sized headers are facilitated and the individual row unit costs can be reduced.

To operate the corn harvesting header 20, after attaching it to the combine base unit 10, rotational power is supplied to the header drive shaft 62 and the header 20 is moved forwardly through a field of row crop material such as corn. The row units 30 are spaced to correspond to the spacing of the rows of corn and each row unit 30 is positioned to engage one row.

The header drive shaft 62 rotates the power input shaft 70 through use of the chain and sprocket means 65 at the sides of the header 20. The power input shaft 70 in turn rotates the slip clutches 80 which are normally engaged to rotate the endless chain 87 of the power transfer means 85. The corresponding rotation of the power receiving sprocket 55 and its associated shaft 56 rotates the various gears 58 positioned within the box beam 50 portion of the frame 35 of the row units 30.

The gathering chains 41 then rotate in opposite directions such that corn stalks 19 are engaged and pulled rearwardly between them and the spaced apart deck plates 96. Simultaneously, the stalk rolls 45 are counter-rotated such that the corn stalks being transported rearwardly between the gathering chains 41 are also pulled downwardly between the stalk rolls 45. The resultant action is that the ear of corn becomes separated from the corn stalk and is conveyed rearwardly to the consolidating auger 22, which delivers the ears of corn to the feeder house 18 for subsequent harvesting treatment.

It will be understood that various changes in the details, materials, steps and arrangement of parts which have been described and illustrated in order to explain the nature of the invention, will occur to and may be made by those skilled in the art upon a reading of the disclosure within the principles and scope of the invention.

Having thus described the invention what is claimed is:

1. A corn harvesting header attachable to a mobile crop treating unit comprising:

a main frame having a transverse substantially horizontal beam;

a plurality of forwardly extending row units supported by said beam, each respective said row unit having gathering means for harvesting and delivering the crop material rearwardly thereof, each said respective row unit being operable to harvest a row of corn;

a gear housing corresponding to each said respective row unit, said gear housing including gears for drivingly operating each respective said gathering means;

at least one transverse power input shaft supported by said frame externally of said gear housings for delivering rotational power thereto from a prime mover;

a clutch means corresponding to each said respective said gear housing, mounted on said at least one power input shaft and operable for terminating the transmission of power from said at least one power input shaft to each respective corresponding gear housing if the associated gathering means becomes overloaded, each respective said clutch means being operable without affecting the transmission of power to any other gear housing; and a power transfer means interconnecting each respective said clutch means and the associated gear housing for transferring the rotational power delivered by said at least one power input shaft to said associated gear housing.

2. The corn header of claim 1 wherein each said respective row unit includes a subframe integral with the corresponding gear housing.

3. The corn header of claim 2 wherein each respective said gathering means includes two adjacent longitudinally extending endless gathering chains, operable for conveying said crop material rearwardly, and a pair of stalk rolls rotatably positioned below said gathering chains and operable to pull said crop material downwardly between said gathering chains.

4. The corn header of claim 3 wherein said gathering chains and said stalk rolls are driven by gears affixed to one common gear shaft.

5. The corn harvester of claim 4 wherein each said gear housing further includes a power receiving shaft operably extending from said gear shaft, said power receiving shaft having a power receiving sprocket affixed thereto, said power transfer means including an endless chain member interconnecting the respective clutch means and said power receiving sprocket such that rotational power is independently transferred from said at least one power input shaft to each said power receiving sprocket.

6. The corn header of claim 5 wherein each respective said row unit is selectively adjustable with respect to spacings between adjacent row units, each respective said clutch means being movable along said at least one power input shaft to correspond to any selective movement of the associated row unit.

7. The corn header of claim 6 further comprising first and second power input shafts, said plurality of row units being divisible into right and left groups, said first power input shaft delivering rotational power to said left group and said second power input shaft delivering rotational power to said right group, both said first and second power input shafts receiving rotational power from said prime mover.

8. The corn header of claim 7 wherein said first and second power input shafts have a hexagonally shaped cross sectional configuration.

9. The corn header of claim 8 wherein each said respective clutch means is secured to the corresponding power input shaft by a set screw.

10. In a corn harvesting header attachable to a mobile combine unit having a main frame; a plurality of forwardly extending row units supported by said main frame, each respective said row unit being operable to harvest a row of corn, each said respective row unit having gathering means for harvesting and delivering crop material rearwardly thereof; a gear housing corresponding to each respective row unit, said gear housing including gears for drivingly operating each respective said gathering means; at least one transverse power input shaft for delivering rotational power from a prime mover; a power transfer means for transferring rotational power from said at least one power input shaft to said gears; and a clutch means adjacent each said respective said power transfer means and cooperable therewith to prevent the transmission of power from said at least one power input shaft to the respective gathering means without disrupting the transfer of power to the remaining row units, the improvement comprising:

said at least one power input shaft is positioned externally of said gear housing, each said clutch means being affixed to said at least one power input shaft externally of said gear housing, said power transfer means being a detachable flexible member.

11. The corn header of claim 10 wherein each said respective said row unit is selectively adjustable with respect to spacing between adjacent row units, each respective said clutch means being movable along said at least one power input shaft to correspond to any selective movement of the associated row unit.

12. The corn header of claim 11 further comprising first and second power input shafts, said plurality of row units being divisible into right and left groups, said first power input shaft delivering rotational power to said left group and said second power input shaft delivering rotational power to said right group.

13. The corn header of claim 12 wherein each said power transfer means includes an endless chain member interconnecting the respective clutch means and a shaft and corresponding sprocket operably extending from within the respective gear housing such that rotational power is independently transferred from the respective said power input shaft to the gears in each respective said gear housing.

14. The corn header of claim 13 wherein each respective said gathering means includes two adjacent forwardly extending endless gathering chains, operable for conveying said crop material rearwardly, and a pair of stalk rolls rotatably positioned below said gathering chains and operable to pull said crop material downwardly between said gathering chains.

15. The corn header of claim 14 wherein said gathering chains and said stalk rolls are driven by gears affixed to one common gear shaft.

* * * * *